United States Patent [19]

Fields

[11] Patent Number: 4,736,831
[45] Date of Patent: Apr. 12, 1988

[54] CAN UNSCRAMBLER

[76] Inventor: W. George Fields, Box 431, Newark, Tex. 76071

[21] Appl. No.: 815,227

[22] Filed: Dec. 31, 1985

[51] Int. Cl.$^4$ ............................................. B65G 47/24
[52] U.S. Cl. ..................................... 198/395; 198/399; 198/400; 198/417; 198/438; 198/689.1
[58] Field of Search ...................... 198/399, 689.1, 398, 198/400, 690.1, 395, 417, 438; 209/597, 540, 544, 587, 905, 644

[56] References Cited

U.S. PATENT DOCUMENTS

| | | | |
|---|---|---|---|
| 1,422,943 | 7/1922 | Eberly | 198/399 |
| 2,505,398 | 4/1950 | Harris | 198/399 |
| 2,873,018 | 2/1959 | Dudley et al. | 198/399 |
| 2,873,841 | 2/1959 | Smith | 198/399 |
| 3,195,724 | 7/1965 | Whitacre | 209/597 |
| 3,235,075 | 2/1966 | Stetter | 198/398 |
| 3,358,810 | 12/1967 | Zauner | 198/689.1 X |
| 3,390,769 | 7/1968 | Tatham et al. | 209/644 X |
| 3,760,453 | 9/1973 | Neumann | 198/689.1 |
| 3,835,985 | 9/1974 | Johnson | 198/398 |
| 3,889,801 | 6/1975 | Boyer | 198/689.1 |
| 4,044,891 | 8/1977 | Pynsky | 209/597 |
| 4,050,570 | 9/1977 | Kramer | 198/398 |
| 4,146,467 | 3/1979 | Sauer et al. | 198/398 |
| 4,593,805 | 6/1986 | Huddle | 198/400 |

FOREIGN PATENT DOCUMENTS

| | | | |
|---|---|---|---|
| 2805271 | 8/1979 | Fed. Rep. of Germany | 198/689.1 |
| 52-73464 | 6/1977 | Japan | 198/400 |

*Primary Examiner*—Joseph E. Valenza
*Assistant Examiner*—Jonathan D. Holmes
*Attorney, Agent, or Firm*—Arthur F. Zobal

[57] ABSTRACT

The invention pertains to an apparatus that orients unfilled cans having an open end and a closed end such that all of the open ends face the same direction. Unoriented or scrambled cans are first loaded onto a vacuum belt and then conveyed into a sorter mechanism. The ends of the cans are coupled to the vacuum belt by a partial vacuum. The closed ends are distinguished from the open ends by proximity switches which control a solenoid regulated air blast capable of knocking cans having their open ends facing one direction off of the vacuum belt and into a gravity track. The cans are turned to a desired orientation as they descend through the gravity track. Cans on the vacuum belt having their open ends facing in another direction are not subjected to an air blast and are removed from the vacuum belt by another gravity track which turns descending cans into the same desired orientation. The newly oriented cans blend together upon exiting from either gravity track.

39 Claims, 4 Drawing Sheets

CAN UNSCRAMBLER

FIELD OF INVENTION

The invention relates to apparatus capable of distinguishing between the open ends and the closed ends of cans and arranging the same cans in a pre-determined manner.

BACKGROUND OF THE INVENTION

Cans are used by many beverage manufacturers to package their product. Much of the manufacturing process of filling the cans with the appropriate beverage is automated, requiring conveyor belts to move the cans from place to place throughout the plant. At each point of the manufacturing process all of the unfilled cans must have the same orientation; the open ends must all face the same direction and the closed ends must face the opposite direction. The unfilled cans are usually very light in weight, thus as the cans are conveyed along, some are inevitably jostled off of the conveyor belt and onto the floor. These jostled or fallen cans have not only lost their place in the manufacturing process but their correct orientation as well. In order to reload the fallen cans back into the system, the original orientation must be restored; the open ends must all face the same direction. Reloading the cans into the manufacturing process is rarely done as a practical matter, even though normal can losses may amount to around 5% of the total number of cans, which in a large plant may mean thousands of cans every day, because reloading by either manual or automatic means is not cost effective. Instead of reloading, the cans are thrown away.

The prior art utilizes a base structure having the shape of a rounded projection onto which a can of random or scrambled orientation is dropped end first. Once the can is dropped onto the base structure, it quickly loses its balance and falls off. If the open end happens to be on top, the can slides off of the base structure in one direction. Conversely, if the closed end is on top, the can slides off in the other direction. Can unscramblers of the prior art have proven to be unreliable for several reasons. Control of the can is lost since the can is dropped and allowed to free fall one way or the other. The can may bounce off of the base structure in the wrong direction, or it may not land on the base structure correctly. Typically, once the cans have fallen off of a conveyor belt, they are washed before being reloaded into the manufacturing process. Any water that remains inside of a can after the washing process tends to alter the balance and cause a can to slide off in the wrong direction.

SUMMARY OF THE INVENTION

It is an object of the present invention to provide an apparatus that will unscramble unfilled cans of scrambled orientation, by orienting the cans such that their open ends all face the same direction, in a reliable manner.

The can unscrambler apparatus has a means for sorting unfilled cans, a means for conveying the cans into the sorting means, and a means for arranging the sorted cans. Cans are sorted into two categories according to which direction their open ends face. Cans having their open ends facing one direction are placed into one category while cans having their open ends facing the opposite direction are placed into the other category. Sorting of the cans is achieved by first distinguishing between the two categories of the cans followed by guiding the cans into their respective arranger means. The cans are conveyed into the sorter means by conveyance means which maintains control over each can until control is relinquished to the sorter means. The arranger means arranges the sorted cans into the same orientation. Throughout the entire unscrambling process, the orientations of the cans are maintained under constant control.

In a preferred embodiment, cans are conveyed to the sorter mechanism in a horizontal position with one end coupled to a conveyor belt by a partial vacuum. Proximity switches distinguish open ends from closed ends as the cans are conveyed past sensory elements. An air blast from a device controlled by the proximity switches strikes the sides of cans having their open ends facing a certain direction. These cans fall into one portion of the arranger mechanism which in the preferred embodiment is a gravity track. The other cans having their open ends facing the opposite direction from those that were air blasted off of the conveyor belt, pass through the proximity switches and stay on the conveyor belt until removed by another gravity track. As the cans fall through the gravity tracks they are turned such that their open ends face the same preselected direction.

DESCRIPTION OF THE PREFERRED EMBODIMENT

Figures 1, 6, 7:
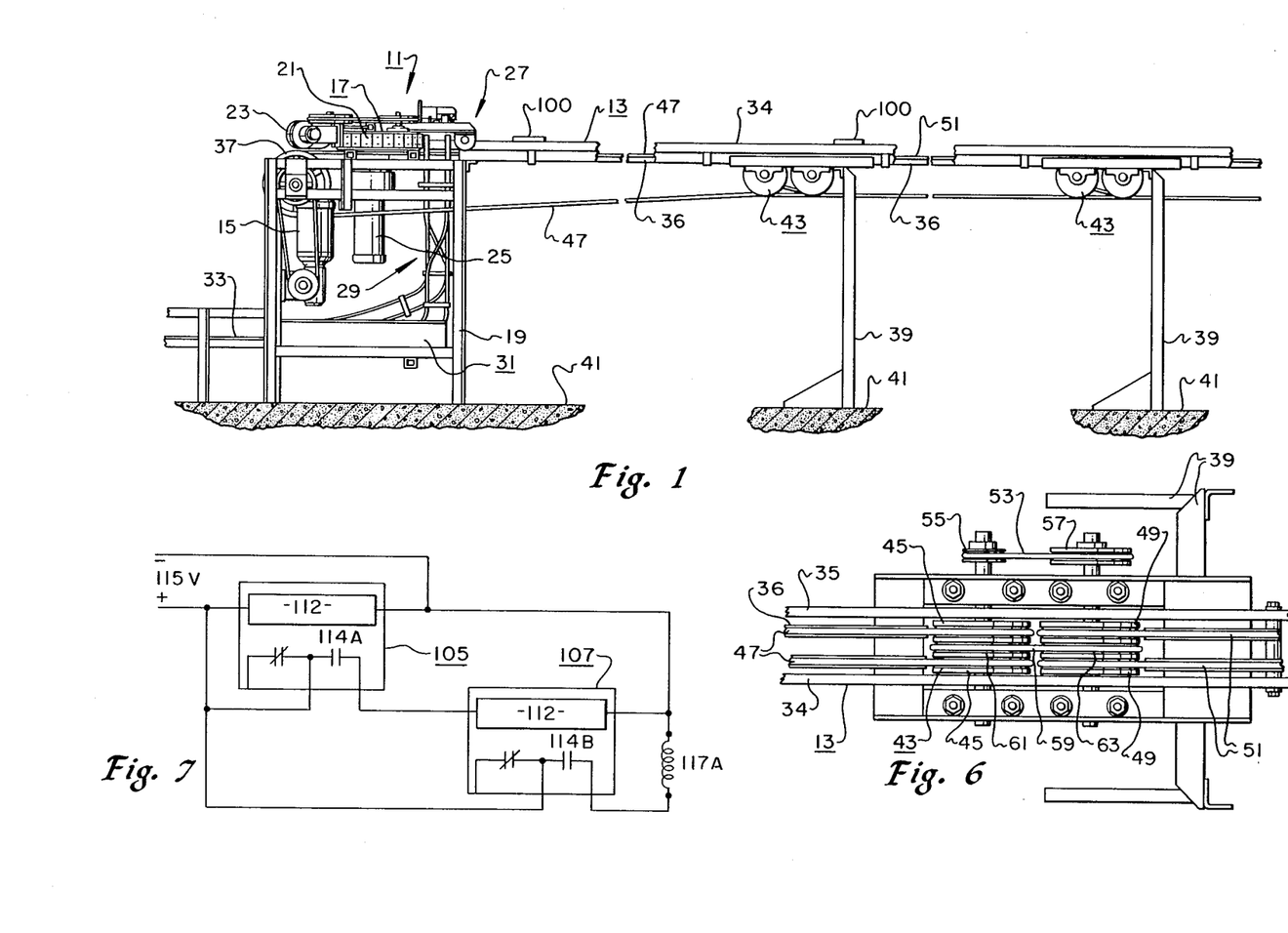
FIG. 1 is a view showing the left side of a can unscrambler apparatus in accordance with a preferred embodiment of the invention with an infeed conveyer and an outfeed conveyer.
FIG. 6 is a top plan view of an acceleration ramp
FIG. 7 is an electrical block diagram showing the electrical connections between the infrared proximity switches and the air solenoid.
Figure 2:
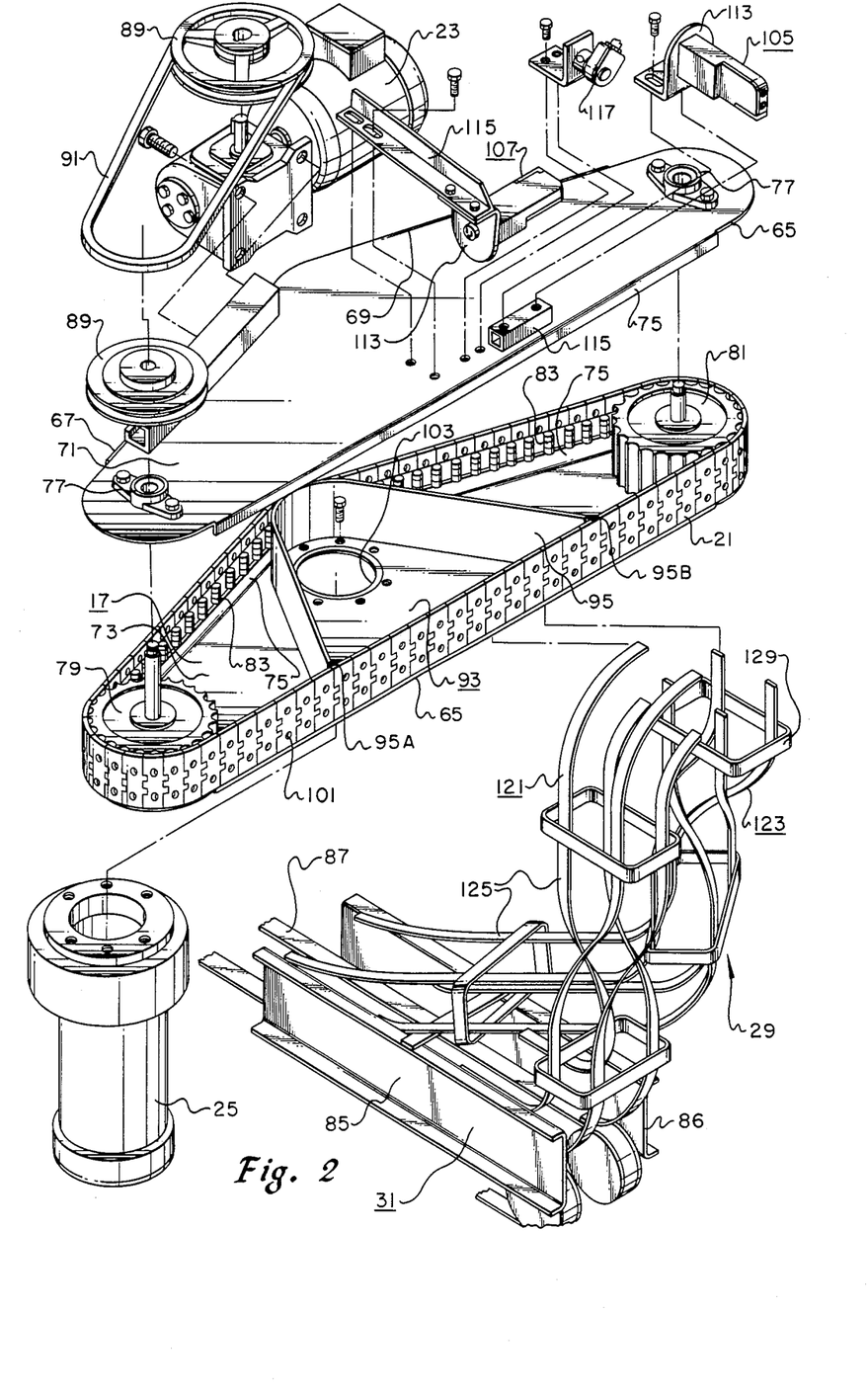
FIG. 2 is an exploded schematic isometric view of the apparatus of FIG. 1.

The can unscrambler apparatus 11 as shown in FIGS. 1 and 2 in accordance with the preferred embodiment of the invention includes as major components a table 17, a table stand 19, a table edge vacuum conveyer belt 21, a table edge vacuum conveyer belt motor 23, a blower motor 25, a sorting mechanism 27, an arranging mechanism 29, and a blender box 31. In addition, the apparatus receives and dispatches cans via an infeed conveyer 13, an infeed conveyer motor 15, and an outfeed conveyer 33.

Figure 5:
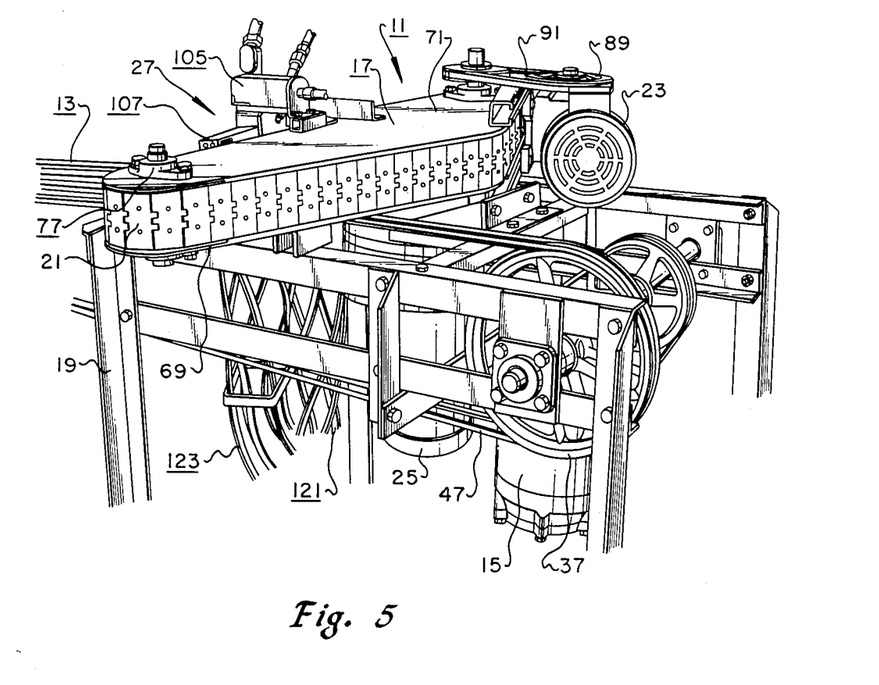
FIG. 5 is a view of the apparatus showing the rear right-hand side.

The infeed conveyer 13 is of the usual type for conveying cans 100 end-to-end and has left and right side rails 34 and 35 and moving cables 47 upon which the cans rest. The moving cables 47 are supported by support rails 36. An infeed motor 15 along with a large diameter pulley 37, located at the rear of the table 17, provide the mechanical power necessary to move the cables 47 and hence the cans. Where the infeed conveyer 13 meets the table 17, the cables traverse the distance between the end of the infeed conveyer and the infeed conveyer motor 15 and pulley 37 beneath the table (see FIG. 5). The right side rail 35 terminates very close to the table edge 65 while the left side rail 34 terminates several inches away from the table edge in order to allow cans to be unloaded from the infeed conveyer 13 onto the table edge conveyer belt 21. Appropriately placed stands 39 support the infeed conveyer 13 off of the floor 41. Incoming cans 100 are loaded in end-to-end fashion onto the infeed conveyer by a gravity hopper-like bin (not shown) where cans of random orientation are stored.

Acceleration ramps 43 increase the distance between the incoming cans 100 in order to prevent jamming the apparatus with too many cans at one time. FIG. 6 illustrates such a ramp where the direction of travel is from right to left. Each acceleration ramp 43 has two sets of pulleys configured to transmit mechanical power from one set of moving cables to another, more slower moving set of cables. Two drive pulleys 45 hold the drive cables 47 which are driven by the infeed motor 15 or by another acceleration ramp located closer to the table 17. Likewise two driven pulleys 49 hold the driven cables 51. The mechanical power necessary to drive the driven cables 51 is provided through the acceleration cable 53 which is wrapped around a first acceleration pulley 55 and a second acceleration pulley 57. The first acceleration pulley 55 turns in unison with the two drive pulleys 45 and the second acceleration pulley 57 turns in unison with the two driven pulleys 49. The first acceleration pulley 55 is of smaller diameter than the second acceleration pulley 57. Consequently, for every full revolution of the first acceleration pulley 55, the second acceleration pulley 57 rotates only a fraction of a full revolution, causing the driven cables 51 to move at a slower speed than the drive cables 47. Since there is no direct coupling between the drive cables 47 and the driven cables 51, cans are transferred over the gap via the transition cable 59. The transition cable 59 is driven by the first transition pulley 61 which is of the same diameter and rotates in unison with the drive pulleys 45. The second transition pulley 63, around which the transition cable 59 is wrapped, rotates free of the driven pulleys 49. Thus the transition cable 59 moves at the same speed as the drive cables 47. As each can 100 reaches an acceleration ramp 43, its speed increases to match the speed of the drive cables 47. Since the first can is moving faster than any cans behind it, the first can covers more distance and thus increases the distance between itself and the cans behind it.

The table 17, supported on the floor 41 by the table stand 19, is shaped like an isosceles triangle and has a front edge 65 and two back edges; a back left edge 67 and a back right edge 69. The table 17 also has a top portion 71 and a bottom portion 73. The edges of each portion have inwardly extending vertical flanges 75 used to support the table edge vacuum conveyor belt 21. The table edge vacuum conveyor belt 21 is a standard commercially available plastic segmented belt. The segments are joined together by hinges 83 located on the inner side of the vacuum belt 21. These hinges 83 serve several functions in addition to the obvious function of allowing greater bendability of the vacuum belt 21. The vacuum belt 21 is guided and supported along the table edge by a track formed by the vertical flanges 75 of the top and bottom portions 71, 73. At the two outer corners of the table 17, holes drilled through each portion allow bearings 77 to be attached to the table for the support of a drive sprocket 79 and a guide sprocket 81. The sprockets 79, 81 engage the hinges 83 to guide and impart motion to the vacuum belt 21. As long as the vacuum belt 21 is wrapped tightly around the table 17, the hinges 83 will stay in the track. One way to ensure the vacuum belt 21 is wrapped tightly around the table is to size the outer circumference of the table 17 according to the inner circumference of the vacuum belt. A method allowing some adjustment utilizes an adjustable guide sprocket to achieve the desired belt tension. The vacuum belt 21 travels around the table 17 in clockwise manner as viewed from overhead. Thus the vacuum belt 21 travels from right to left along the front edge 65 of the table 17. The table edge vacuum conveyer belt motor 23 which is mounted onto the top portion of table 17 along one of the back edges 67 supplies the mechanical power necessary to move the vacuum belt 21. The motor 23 is coupled to the drive sprocket 79 by pulleys 89 and a belt 91.

A chamber 93 within the table 17 is created by the inside surfaces of the top and bottom portions 71, 73 and by a vertical wall 95 that extends from the bottom portion in an upward manner. The wall 95, fashioned in an arcuate manner, extends from its left edge 95A to the back corner and then to its right edge 95B. The left edge 95A abuts the left side of the front edge 65 of the table 17, and the right edge 95B abuts the right side of the front edge of the table. The wall 95 is of sufficient height to abut the inside surface of the top portion. A rectangular open portion 99 is created in the chamber 93 along the front edge 65 of the table 17. The open portion 99 is defined by the free edges of the vertical flanges 75 along the front edges of the top and bottom portions 71, 73 of the table 17 and the left and right edges 95A, 95B of the vertical wall 95. The vacuum belt 21 traverses across this open portion 99. Apertures 101, extending through the vacuum belt 21, allow communication between the chamber 93 and the outside air. A circular hole 103 in the bottom portion 73 of the table is provided to complete an air circulation route inside of the chamber 93. The blower motor 25 is mounted to the underside of the table 17 such that it completely encompasses the circular hole 103. Except for the open portion 99 and the circular hole 103, once the top portion 71 of the table 17 is installed onto the bottom portion 73, the chamber 93 is air tight. When the blower 25 is turned on, it suctions air from the chamber creating a partial vacuum therein. Air from the outside enters the chamber 93 through whatever apertures 101 are in front of the open portion 99 in an effort to equalize pressure. An air flow is established at the apertures 101 in an inward direction, thus lowering the pressure and creating a partial vacuum at the apertures. An object abutting the vacuum belt 21 in such a way that a space is created between the belt and the object, and that space overlays at least one aperture, can be held on the vacuum belt and possibly even supported by the suction created. Unfilled aluminum cans of the type used for beverages are ideally suited for conveyance along flat vacuum belts since both ends of a can are flat and have an air space. The bottom end of a can, even though it is closed, has a small cavity and the open top end of the can has, of course, a very large cavity consisting of the interior of the can. Thus either end of the can presents an appropriate air space upon which a suction can be maintained.

In addition, the weight of an unfilled can is very slight, enabling the can to be conveyed in any position, including horizontally. In the preferred embodiment, the apertures 101 are distributed along the vacuum belt 21 such that any can placed on the vacuum belt in a random manner will overlay at least one aperture. An alternative arrangement of conveying cans along the belt by suction means or partial vacuum means is to create an air pocket between the belt and the can by reconfiguring the belt. Instead of a flat belt, the outer surface of the belt could have small pockets that are sealed by the sides of the can. In this manner, cans having inadequate air pockets at the ends could be conveyed along the table edge.

The sorting mechanism 27 includes a first infrared proximity switch 105, a second infrared proximity switch 107, an air solenoid 117, the vacuum belt 21, the upper portion of the left-hand gravity track 121, and the upper portion of the right-hand gravity track 123. The two infrared proximity switches 105, 107 are standard commercially available proximity detectors. The preferred embodiment utilizes Type 42 MRA photoelectric controls, manufactured by Electronics Corporation of America, Photoswitch Division. Employing a converging infrared beam, the proximity switches can detect surfaces that are within its field of view, which is about two inches away from the sensory elements. As long as the closed end is within two inches of the sensory elements, the closed end will be detected. A can oriented with its open end towards the sensory elements has its closed end beyond the field of view since the can is typically 4½ to 5 inches in length. Each proximity switch has as part of its sensory elements two small lenses; one 109 of which directs an infrared beam, the other 111 receives the reflection off of a nearby surface. The sensory elements, are connected to a sensor and switch activator portion 112 of the proximity switch (see FIG. 7). Two different outputs are available from the Type 42 MRA proximity switches 105, 107; a normally closed switch and a normally open switch. The normally closed switch opens and the normally open switch closes whenever activated by the sensor and switch activator portion 112. Only the normally open switches 114A, 114B are utilized in the preferred embodiment. The proximity switches can operate in one of two modes; light energized and dark energized. In the light energized mode, the sensor and switch activator portion 112 activates the switches upon detection of a nearby surface. In the dark energized mode, the sensor and switch activator portion 112 activates the switches upon the failure to detect a nearby surface.

Figure 3:
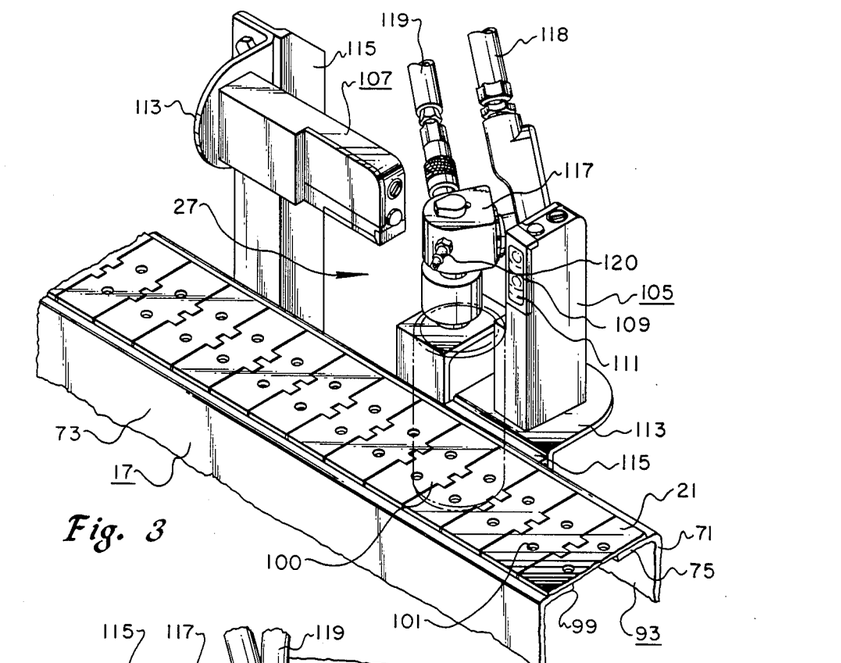
FIG. 3 is a view of a portion of the sorting mechanism of FIG. 2 as seen from the lower right-hand side and rotated 90° rearward.
Figure 4:
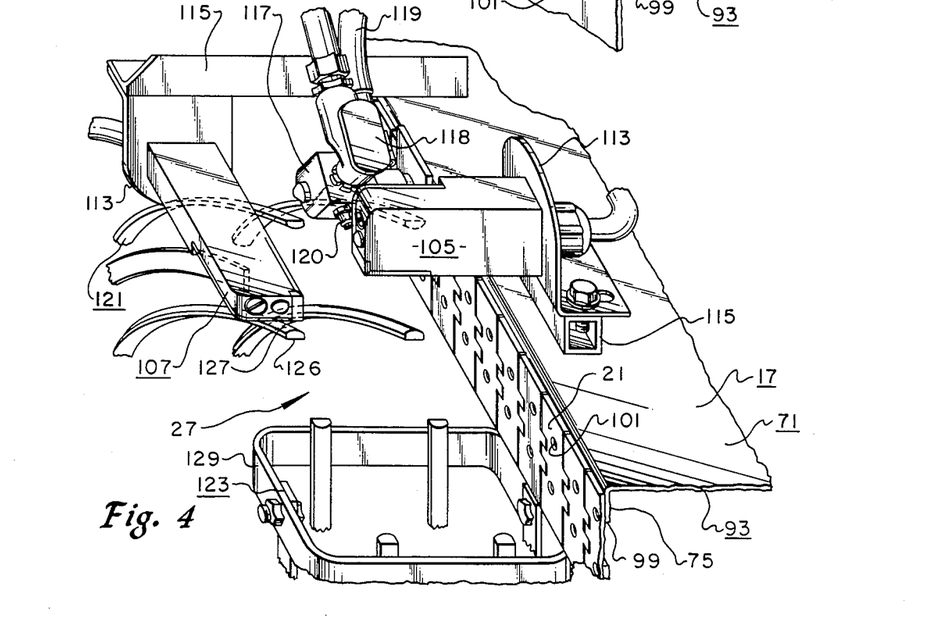
FIG. 4 is a view of the sorting mechanism, showing the upper portions of the arranger mechanism, as seen from the upper right-hand side.

Referring to FIGS. 3 and 4 the proximity switches 105, 107 are mounted on universal mounts 113 which in turn are mounted onto mounting brackets 115 that are bolted onto the top portion 71 of the table 17. The universal mounts 113 allow rotation of the proximity switches 105, 107 for alignment purposes. The first proximity switch 105 senses the side of a can and determines when the end of a can is present in the field of view of the second proximity switch 107. In order to do this, the first proximity switch 105 juts out in a perpendicular manner from the top of the table 17 past the vacuum belt 21. The second proximity switch 107 faces the vacuum belt with its sensory elements. Sufficient distance is allowed between the second proximity switch 107 and the vacuum belt 21 to enable a can to pass through. This proximity switch 107 senses the outermost end of the can and determines if the end is open or closed. The air solenoid 117 is also a standard commercially available item and comprises a solenoid controlled valve for releasing pressurized air when activated. The solenoid 117 has an electrical input 118, a pressurized air input 119, and a pressurized air output nozzle 120. Pressurized air is input into the solenoid 117 from an external supply. Such pressurized air supplies are common to beverage plants; typically the air is pressurized to around 100 psi. The solenoid 117 is mounted to the top portion 71 of the table 17 with the nozzle 120 pointed to the side of a can within the field of view. Immediately below the field of view is the upper portion of the right-hand gravity track 123. To the left of the field of view is the curved upper portion of the left-hand gravity track 121 positioned to remove any can that passes the proximity switches 105, 107 from the belt. Once a can passes the proximity switches it always goes into the left-hand gravity track 121.

FIG. 7 illustrates the wiring connection between the two infrared proximity switches 105, 107 and the coil 117A of the air solenoid 117. Power is continuously applied to the sensor and switch activator portion 112 of the first infrared proximity switch 105 which is in the light energized mode. Power to the sensor and switch activator portion 112 of the second infrared proximity switch 107 is controlled through the normally open switch 114A of the first proximity switch. The coil 117A of the solenoid 117 is controlled via the normally open switch 114B of the second infrared proximity switch 107 which is set to the dark energized mode.

The cans are arranged into the proper orientation by the arranging mechanism 29 which includes the left-hand gravity track 121 and the right-hand gravity track 123. Each gravity track is composed of body rods 125 having a flat base portion 126 and a rounded top portion 127. The body rods are configured into a rectangular chute by braces 129 attached to the flat base portions 126. The inner dimensions of the chute are roughly equivalent to the outer dimensions of unfilled cans. The gravity tracks 121, 123 lead from the sorter mechanism 29 downward to the blender box 31. As a can decends towards the floor in the right-hand gravity track 123 the can is rotated counterclockwise 90°. Cans decending in the left-hand gravity track 121 are rotated clockwise 90°. The cans are thus arranged into the same orientation.

Figure 8:
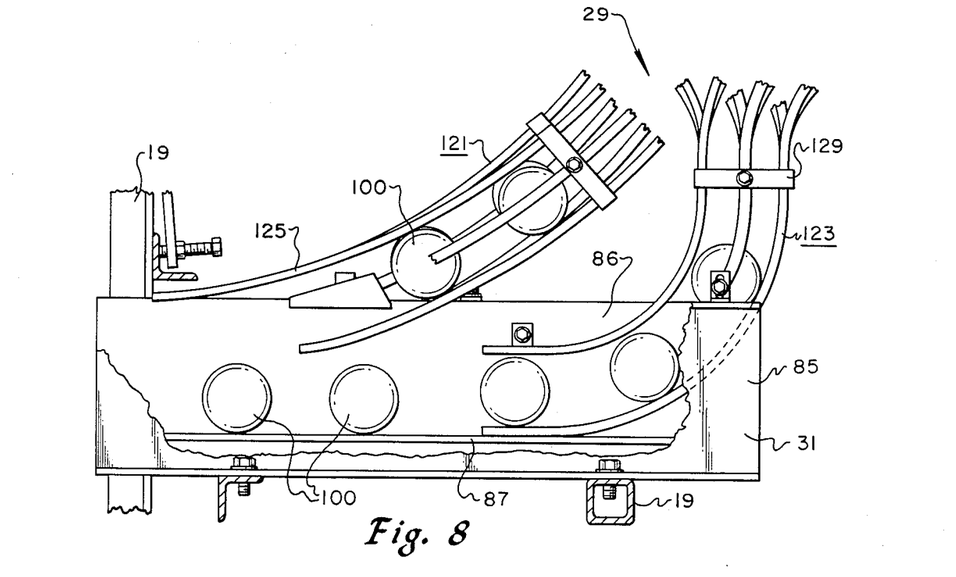
FIG. 8 is a partially cut away view of the blender box and arranging mechanism.

The blender box 31 has a left side wall 85, a right side wall 86 and a bottom conveyer belt 87. The cans, conveyed sideways, are kept in alignment by the side walls 86 which prohibit rotation of the cans 31. The gravity tracks 121, 123, after having arranged the cans into their proper orientation, dump the cans into the blender box 31 which conveys them via the bottom conveyer belt 87 to an outfeed conveyer 33 and on into the manufacturing process (see FIG. 8). As the can from one gravity track fall into the blender box 31, they mingle or blend with the cans that have fallen from the other gravity track. The bottom conveyer belt 87 may be powered by the infeed conveyer motor 15 or by some other motor.

Operation of the apparatus is as follows: randomly oriented cans 100 are loaded onto the infeed conveyer 13 in end-to-end fashion and proceed downstream to the table 17. Upon arriving at the vacuum belt 21 at a point to the left of the right edge 95B of the wall 95, the downstream end of each can becomes coupled to the vacuum belt by the partial vacuum created inside the end air pocket and the can is discharged from the infeed conveyer 13. The vacuum belt 21 moves the can into the sorter mechanism 27 which sorts or separates the cans into two categories. The first category consists of those cans that have their open ends facing away from the table 17. The second category consists of those cans that have their open ends facing towards the table 17. In order to effectively sort the cans into their appropriate categories, the open ends must be distinguished from the closed ends. This is done in the preferred embodiment by infrared proximity switches 105, 107, although other types of proximity switches may be used. Once the ends have been distinguished, the cans must be guided into one of two preselected positions. For example, in the preferred embodiment, when a can is not in front of the sensory element of the first proximity switch 105, the second proximity switch 107 is off and the normally open switch 114B stays open. However when a can 100 is in front of the sensory elements of the first proximity switch 105, the normally open switch 114A closes, turning on the second proximity switch 107 and thereby indicates a can is within the field of view. If the open and faces the second proximity switch 107 (since the second proximity switch is in the dark energized mode and therefore it does not detect the open end of the can) the sensor and switch activator portion 112 activates the switches and closes the normally open switch 114B. This in turn activates the solenoid 117 and releases a stream of pressurized air toward the side of the can. The can 100, knocked off the vacuum belt 21 by the pressurized air, enters the upper portion of the right-hand gravity track 123 located below the first proximity switch 105. Once the can has left the field of view, the first proximity switch 105 turns off the second proximity switch 107 which then shuts off the air solenoid 117. As the can descends inside of the right-hand gravity track 123, it is turned counterclockwise. By the time the can enters the blender box 31, its open end faces the right side wall 86 at the blender box 31. If however, the closed end of the can faces the second proximity switch, the solenoid is not activated and the can enters the upper portion of the left-hand gravity track 121. The can is removed from the vacuum belt 21 by the track 121 before it reaches the left edge 95A of the wall 95. Each can is loaded onto and removed from the vacuum belt at some point within the limits defined by the open portion 99 and between the edges 95B and 95A. This enables the can to be firmly held onto the vacuum belt by a partial vacuum during the time the can is on the vacuum belt. As the can descends inside of the left-hand gravity track, it is turned clockwise such that by the time the can enters the blender box 31, its open end also faces the right side wall 86 of the blender box 81. Thus the cans, no matter what their previous orientation, are arranged into the same orientation.

The sorting mechanism allows flexibility in arranging the cans. In the preceding paragraph the open ends were arranged to face towards the right side wall 86. By simply changing the second proximity switch from the dark energized mode to the light energized mode, the open ends would be arranged to face towards the left side wall 85.

An alternative embodiment would utilize only one proximity switch positioned to sense the outer ends of cans.

Throughout the entire unscrambling process, control is maintained over the cans. As the cans are conveyed on the vacuum belt, they are held tightly in place by a partial vacuum. Secured in this way, the cans are conveyed into the sorter mechanism where they are removed from the vacuum belt and guided elsewhere; either the cans are air blasted off into a gravity track, or removed by another gravity track. At no time is a can left uncontrolled. This insures a high degree of reliability in unscrambling the cans.

The following disclosure and the showings made in the drawings are merely illustrative of the principles of this invention and are not meant to be interpreted in a limiting sense.

I claim:

1. An apparatus for conducting operations on unfilled aluminum cans of the type having an open end and a closed end and that have become disoriented such that the open ends of some cans face different directions from the open ends of other cans and the closed ends of some cans face the same direction as the open ends of other cans, said operations resulting in the orientation of said cans such that all of the open ends of said cans face the same direction and all of the closed ends of said cans face a direction opposite to the direction faced by the open ends, comprising:

sorting means for sorting said cans into first and second categories, said first category comprising those cans that have their open ends facing a first direction and said second category comprising those cans that have their open ends facing a second direction that is opposite to said first direction, conveying means for conveying said cans one at a time through said sorting means for sorting said cans, said cans being conveyed until disengaged from said conveying means by said sorting means for sorting said cans, whereby the movement of said cans is continually controlled, said conveying means comprising, a chamber with an open portion, belt means supported to move past said open portion, means for moving said belt means past said open portion, apertures extending through said belt means, means for creating a partial vacuum in said chamber for producing a partial vacuum at the apertures for holding the cans onto the said belt means such that the cans are supported only by said belt means and the partial vacuum when conveyed through said sorting means by said belt means, means for arranging said sorted cans into the same orientation such that all of the open ends of said cans face the same direction and all of the closed ends of said cans face in a direction which is opposite to the direction faced by the open ends.

2. The apparatus of claim 1 wherein said sorting means for sorting said cans further comprises:

means for distinguishing between said open ends and said closed ends of said cans, means for guiding said cans of said first category to a portion of said means for arranging and said cans of said second category to another portion of said means for arranging.

3. The apparatus of claim 2 wherein said means for distinguishing between said open ends and said closed ends comprises an infrared proximity switch and said means for guiding said cans of said first category comprises a solenoid controlled means for producing an air blast wherein said solenoid controlled means is activated by said proximity switch.

4. The apparatus of claim 2 wherein said means for distinguishing between said open ends and said closed ends comprises a first infrared proximity switch that senses the side of a can, and a second infrared proximity switch that senses one of the ends of the same can at a point in distance close to that of said first infrared proximity switch, and said means for guiding said cans of said first category comprises a solenoid controlled means for producing an air blast wherein said solenoid controlled means is activated by said first and second proximity switches.

5. The apparatus of claim 4 wherein said means for arranging said sorted cans comprises two twisted gravity tracks.

6. The apparatus of claim 2, wherein:
each of said cans are held onto said belt means with one end thereof adjacent to said belt means and the other end facing outward thereof,
said cans on said belt means being oriented such that some of said cans have their outwardly facing ends open and some of said cans have their outwardly facing ends closed defining first and second orientations of said cans on said belt means,
said means for distinguishing between said open ends and said closed ends of said cans comprises proximity detecting means for sensing the outwardly facing ends of said cans on said belt means for determining whether said cans are in said first or second orientation on said belt means.

7. The apparatus of claim 6, wherein said removal means comprises means responsive to said detecting means for producing an air blast against each of said cans on said belt means which is in a predetermined one of said orientations on said belt means to remove said cans from said belt means.

8. The apparatus of claim 2, wherein:
each of said cans are held onto said belt means with one end thereof adjacent to said belt means and the other end facing outward thereof,
said cans on said belt means being oriented such that some of said cans have their outwardly facing ends open and some of said cans have their outwardly facing ends closed defining first and second orientations of said cans on said belt means,
said means for distinguishing between said open ends and said closed ends of said cans comprises first proximity detecting means for detecting the sides of said cans on said belt means and a second proximity detecting means located near said first detecting means and responsive to said first detecting means for sensing the outwardly facing ends of said cans on said belt means for determining whether said cans are in said first or second orientation on said belt means.

9. The apparatus of claim 8, wherein said guide means comprises means responsive to said first and second detecting means for producing an air blast against each of said cans on said belt means which is in a predetermined one of said orientations on said belt means to remove said cans from said belt means.

10. The apparatus of claim 9, wherein said means for arranging said sorted cans comprises two twisted gravity tracks.

11. The apparatus of claim 1 wherein said means for arranging said sorted cans comprises two twisted gravity tracks.

12. The apparatus of claim 1 further comprising:
means for conveying disoriented cans to said belt means whereby said cans become held by said belt means,
means for conveying oriented cans away from said means for arranging said sorted cans.

13. An apparatus for orienting unfilled aluminum cans of the type being cylindrical in shape and having an open end and a closed end, comprising:
structure forming a chamber having an open portion,
belt means supported to move past said open portion,
means for moving said belt means past said open portion,
apertures extending through said belt means,
means for reducing the air pressure in said chamber for forming reduced air pressure at said apertures for holding cans on said belt means,
infeed conveyer means for moving cans to said belt means for transfer to said belt means such that the ends of the cans are held on said belt means by the reduced air pressure at said apertures with the other ends of the cans facing outwardly of said belt means,
the cans on said infeed conveyer means being oriented such that their open ends face in first and second opposite directions,
the cans when transferred to said belt means being oriented such that some of the cans have their outwardly facing ends open and some of the cans have their outwardly facing ends closed defining first and second orientations of cans on said belt means,
detecting means for sensing the outwardly facing ends of the cans on said belt means for detecting cans of one of said orientations on said belt means as the cans are moved near said detecting means by said belt means,
removal means responsive to said detecting means for removing from said belt means the cans of said one orientation detected by said detecting means,
means for transferring the removed cans of said one orientation to an outfeed conveyer means such that their open ends face in a given direction, and
means next to said belt means and downstream of said detecting means for transferring the cans of the other said orientations from said belt means to said outfeed conveyer means such that their open ends face in said given direction.

14. The apparatus of claim 13, wherein:
said infeed conveyer means extends transversely to said belt means and comprises structure for supporting and moving cylindrical shaped cans on their sides such that each can has a leading end and a trailing end as it is moved on said infeed conveyer means to said belt means where its leading end will engage and be held onto said belt means by the reduced air pressure at said apertures of said belt means.

15. The apparatus of claim 14, wherein:
the plane of said belt means is generally vertical wherein the axes of said cylindrical shaped cans when held on said belt means are generally horizontal,
said infeed conveyer means extends transversely to and under said belt means for allowing the leading ends of the cylindrical shaped cans to engage said belt means as they are moved to said belt means by said infeed conveyer means.

16. The apparatus of claim 15, wherein:

said removal means for removing the cans from said belt means comprises an air blast means for providing an air blast agains the cans of said one orientation detected by said detecting means.

17. The apparatus of claim 15, comprising:
a further detecting means, defined as a first detecting means, for detecting the sides of said cans on said belt means,
said detecting means for detecting cans of said one orientation on said belt means being defined as a second detecting means and being located near said first detecting means,
said second detecting means being responsive to said first detecting means for detecting cans of said one orientation on said belt means,
said removal means for removing the cans from said belt means comprises an air blast means for providing an air blast against the cans of said one orientation detected by said second detecting means.

18. An apparatus for conducting operations on unfilled aluminum cans of the type having an open end and a closed end and that have become disoriented such that the open ends of some cans face different directions from the open ends of other cans and the closed ends of some cans face the same direction as the open ends of other cans, said operations resulting in the orientation of said cans such that all of the open ends of said cans face the same direction and all of the closed ends of the cans face a direction opposite to the direction faced by the open ends, comprising:
conveying means for conveying said cans one at a time, comprising:
a chamber with an open portion,
belt means supported to move past said open portion,
means for moving said belt means past said open portion,
apertures extending through said belt means,
means for creating a partial vacuum at the apertures for holding the cans onto said belt means,
wherein each of said cans are conveyed with one of its ends contacting said belt means and the other end facing outwardly from said belt means,
said cans on said belt means being oriented such that some of said cans have their outwardly facing ends open and some of said cans have their outwardly facing ends closed defining first and second orientations of said cans on said belt means,
detecting means located relative to said belt means for sensing the outwardly facing ends of said cans on said belt means for determining whether said cans on said belt means passing said detecting means are in said first or second orientation,
air blast means responsive to said detecting means for producing an air blast against said detected cans which are in a predetermined one of said orientations on said belt means for removing said cans from said belt means,
the cans being supported only by said belt means and the partial vacuum when conveyed to said air blast means by said belt means,
a first gravity track having an open entry portion positioned near said belt means and near said air blast means for receiving said cans removed by said air blast means,
said first gravity track having a shape such that a can exiting from said first gravity track has its open end facing a first direction, and
a second gravity track having an open entry portion positioned downstream from said first gravity track entry portion and near said belt means so as to remove any cans that have not yet been removed from said belt means by said air blast means,
said second gravity track having a shape such that a can exiting from said second gravity track has its open end facing said first direction.

19. The apparatus of claim 18 comprising conveyer belt means located to receive said cans exiting from said first and second gravity tracks such that all of said cans on said conveyer belt means have their open ends facing in said first direction.

20. The apparatus of claim 18, wherein said detecting means comprises an infrared sensory element.

21. An apparatus for orienting unfilled aluminum cans of the type being cylindrical in shape and having an open end and a closed end, comprising:
structure forming a chamber having opening means,
belt means supported to move past said opening means,
means for moving said belt means past said opening means,
apertures extending through said belt means,
means for reducing the air pressure in said chamber for forming reduced air pressure at said apertures for holding cans on said belt means,
infeed conveyer means for moving cans to said belt means for transfer to said belt means such that the ends of the cans are held on said belt means by the reduced air pressure at said apertures with the other ends of the cans facing outwardly of said belt means,
the cans on said infeed conveyer means being oriented such that their open ends face in first and second opposite directions whereby the outwardly facing ends of some of the cans on said belt means are open and the outwardly facing ends of some of the cans on said belt means are closed defining first and second orientations of cans on said belt means,
detecting means for sensing the outwardly facing ends of the cans on said belt means for detecting cans of one of said orientations on said belt means as the cans are moved near said detecting means by said belt means,
means responsive to said detecting means for removing from said belt means the cans of said one orientation detected by said detecting means, and
means for transferring the removed cans of said one orientation to an outfeed conveyer means such that their open ends face in a given direction.

22. The apparatus of claim 21, comprising:
a further detecting means, defined as a first detecting means, for detecting the sides of said cans on said belt means,
said detecting means for detecting cans of said one orientation on said belt means being defined as a second detecting means and being located near said first detecting means,
said second detecting means being responsive to said first detecting means for detecting cans of said one orientation on said belt means.

23. The apparatus of claim 22, wherein said means for removing the cans from said belt means comprises an air blast means for providing an air blast against the cans of said one orientation detected by said second detecting means.

24. The apparatus of claim 23, wherein:

said means for transferring the removed cans of said one orientation to said outfeed conveyer means is defined as a first transferring means, and a second transferring means downstream of said first transferring means and next to said belt means for transferring the cans of the other of said orientations from said belt means to said outfeed conveyer means such that their open ends face in said given direction.

25. The apparatus of claim 24, wherein:
each of said detecting means comprises means for producing a beam of energy and means for receiving the reflection of the beam off of a surface.

26. The apparatus of claim 22, wherein:
said means for transferring the removed cans of said one orientation to said outfeed conveyer means is defined as a first transferring means, and a second transferring means downstream of said first transferring means and next to said belt means for transferring the cans of the other of said orientations from said belt means to said outfeed conveyer means such that their open ends face in said given direction.

27. The apparatus of claim 22, wherein:
each of said detecting means comprises means for producing a beam of energy and means for receiving the reflection of the beam off of a surface.

28. The apparatus of claim 21, wherein:
said detecting means comprises means for producing a beam of energy and means for receiving the reflection of the beam off of a surface.

29. The apparatus of claim 21, wherein:
said infeed conveyer means comprises moveable means for supporting and moving cylindrical shaped cans on their sides such that each can has a leading end and a trailing end as it is moved on said infeed conveyer means to said belt means where its leading end will engage and be held onto said belt means by the reduced air pressure at said apertures of said belt means.

30. The apparatus of claim 29, wherein:
the plane of said belt means is generally vertical wherein the axes of said cylindrical shaped cans when held on said belt means are generally horizontal.

31. The apparatus of claim 30, wherein:
said means for removing the cans from said belt means comprises an air blast means for providing an air blast against the cans of said one orientation detected by said detecting means.

32. The apparatus of claim 30, comprising:
a further detecting means, defined as a first detecting means, for detecting the sides of said cans on said belt means, said detecting means for detecting cans of said one orientation on said belt means being defined as a second detecting means and being located near said first detecting means, said second detecting means being responsive to said first detecting means for detecting cans of said one orientation on said belt means, said means for removing the cans from said belt means comprises an air blast means for providing an air blast against the cans of said one orientation detected by said second detecting means.

33. The apparatus of claim 29, wherein:
the cans are supported only by said belt means and the partial vacuum when conveyed by said belt means to said means responsive to said detecting means for removing from said belt means the cans of said one orientation detected by said detecting means.

34. The apparatus of claim 29, wherein said infeed conveyer means comprises at least two sets of end-to-end cables with the cable closest to said belt means being driven at a faster speed than the other cable.

35. The apparatus of claim 34, wherein:
the cans are supported only by said belt means and the partial vacuum when conveyed by said belt means to said means responsive to said detecting means for removing from said belt means the cans of said one orientation detected by said detecting means.

36. The apparatus of claim 34, wherein:
the plane of said belt means is generally vertical wherein the axes of said cylindrical shaped cans when held on said belt means are generally horizontal.

37. The apparatus of claim 21 wherein:
the cans are supported only by said belt means and the partial vacuum when conveyed by said belt means to said means responsive to said detecting means for removing from said belt means the cans of said one orientation detected by said detecting means.

38. An apparatus for orienting unfilled aluminum cans of the type being cylindrical in shape and having an open end and a closed end, comprising:
structure forming a chamber having opening means, conveying means supported to move past said opening means, means for moving said conveying means past said opening means, apertures extending through said conveying means, means for reducing the air pressure in said chamber for forming reduced air pressure at said apertures for holding cans on said conveying means, infeed conveyer means for moving cans to said conveying means for transfer to said conveying means such that the ends of the cans are held onto the outer surface of said conveying means by the reduced air pressure at said apertures with the other ends of the cans facing outwardly of said conveying means, said infeed conveyer means extends to said conveying means and comprises moveable means for supporting and moving cylindrical shaped cans on their sides such that each can has a leading end and a trailing end as it is moved on said infeed conveyer means to said conveying means where its leading end will engage and be held onto said conveying means by the reduced air pressure at said apertures of said conveying means, the plane of said outer surface of said conveying means is generally vertical wherein the axes of said cylindrical shaped cans when held on said conveying means are generally horizontal, the cans on said infeed conveyer means being oriented such that their open ends face in first and second opposite directions whereby the outwardly facing ends of some of the cans on said conveying means are open and the outwardly facing ends of some of the cans on said conveying means are closed defining first and second orientations of cans on said conveying means, detecting means for sensing the outwardly facing ends of the cans on said conveying means for detecting cans of one of said orientations on said conveying means as the cans are moved near said detecting means by said conveying means, means responsive to said detecting means for removing from said conveying means the cans of said one orientation detected by said detecting means, means for transferring the removed cans of said one orientation to an outfeed conveyer means such that their open ends face in a given direction.

39. An apparatus for orienting unfilled aluminum cans of the type being cylindrical in shape and having an open end and a closed end, comprising:

structure forming a chamber having opening means, conveying means supported to move past said opening means, means for moving said conveying means past said opening means, apertures extending through said conveying means, means for reducing the air pressure in said chamber for forming reduced air pressure at said apertures for holding cans on said conveying means, infeed conveyer means for moving cans to said conveying means for transfer to said conveying means such that the ends of the cans are held onto said conveying means by the reduced air pressure at said apertures with the other ends of the cans facing outwardly of said conveying means, said infeed conveyer means extends to said conveying means and comprises moveable means for supporting and moving cylindrical shaped cans on their sides such that each can has a leading end and a trailing end as it is moved on said infeed conveyer means to said conveying means where its leading end will engage and be held onto said conveying means by the reduced air pressure at said apertures of said conveying means, the cans on said infeed conveyer means being oriented such that their open ends face in first and second opposite directions whereby the outwardly facing ends of some of the cans on said conveying means are open and the outwardly facing ends of some of the cans on said conveying means are closed defining first and second orientations of cans on said conveying means, detecting means for sensing the outwardly facing ends of the cans on said conveying means for detecting cans of one of said orientations on said conveying means as the cans are moved near said detecting means by said conveying means, means responsive to said detecting means for removing from said conveying means the cans of said one orientation detected by said detecting means, the cans being supported only by said conveying means and the partial vacuum when conveyed by said conveying means to said means responsive to said detecting means for removing from said conveying means the cans of said one orientation detected by said detecting means, and means for transferring the removed cans of said one orientation to an outfeed conveyer means such that their open ends face in a given direction.

* * * * *